(12) United States Patent
Suzuki et al.

(10) Patent No.: US 7,746,574 B2
(45) Date of Patent: Jun. 29, 2010

(54) BONDED OPTICAL ELEMENT

(75) Inventors: Tetsuya Suzuki, Osaka (JP); Tomokazu Tokunaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 85 days.

(21) Appl. No.: 12/121,263

(22) Filed: May 15, 2008

(65) Prior Publication Data

US 2008/0297920 A1    Dec. 4, 2008

(30) Foreign Application Priority Data

May 18, 2007    (JP)    ............... 2007-133363

(51) Int. Cl.
G02B 9/00    (2006.01)
G02B 13/18    (2006.01)
G02B 3/08    (2006.01)

(52) U.S. Cl. .................. 359/796; 359/718; 359/741

(58) Field of Classification Search ............. 359/718, 359/741, 796
See application file for complete search history.

(56) References Cited

U.S. PATENT DOCUMENTS

| 5,160,361 A | 11/1992 | Murata et al. | |
| 6,551,530 B2 * | 4/2003 | Koizumi et al. | ............ 264/1.36 |
| 2007/0091472 A1 | 4/2007 | Alkemper et al. | |
| 2007/0119212 A1 | 5/2007 | Huang et al. | |
| 2008/0285154 A1 | 11/2008 | Suzuki et al. | |

FOREIGN PATENT DOCUMENTS

| JP | 60-067118 | 4/1985 | |
| JP | 10-045419 | 2/1998 | |
| JP | 3763552 | 1/2006 | |
| JP | 2006-171164 A * | 6/2006 | ................. 359/796 |

OTHER PUBLICATIONS

United States Office Action issued in related U.S. Appl. No. 12/121,125, dated Nov. 3, 2009.
United States Office Action issued in related U.S. Appl. No. 12/121,227, dated Nov. 3, 2009.
United States Office Action issued in related U.S. Appl. No. 12/121,155, dated Sep. 18, 2009.
Related U.S. Appl. No. 12/121,125, filed May 15, 2008.
Related U.S. Appl. No. 12/121,227, filed May 15, 2008.
Related U.S. Appl. No. 12/121,155, filed May 15, 2008.

* cited by examiner

*Primary Examiner*—Evelyn A. Lester
(74) *Attorney, Agent, or Firm*—McDermott Will & Emery LLP

(57) ABSTRACT

In a bonded optical element, a second optical element is bonded to a first optical element by forming the second optical element by heating and pressing against the first optical element a second optical element material. The second optical element includes an element body part and a contact part extending from the element body part to be in contact with the outer peripheral face of the first optical element.

8 Claims, 5 Drawing Sheets

(a)

(b)

BONDED OPTICAL ELEMENT

FIELD OF THE INVENTION

The present invention relates to optical elements used for optical systems and the like, such as picture-taking lenses, optical pickups, and the like and especially relates to a bonded optical element in which optical elements different from each other are bonded to each other.

DESCRIPTION OF RELATED ART

Conventionally, bonded optical elements in which two or more kinds of lenses or prisms are bonded to each other are manufactured in such a manner that optical elements finished in advance by grinding, polishing, pressing, or the like are bonded to each other by means of an adhesive typified by a UV curing agent. This method, however, involves a step of manufacturing each optical element, a positioning step of arranging and positioning the two or more optical elements highly accurately, and a bonding step of applying and curing the adhesive uniformly with air void eliminated, which serve as a bar to increases in accuracy and productivity of the bonded optical elements.

For tackling this problem, there has been proposed in order to eliminate the positioning step and the bonding step methods for forming a bonded optical element by bonding by fusing glass materials.

For example, Patent Document 1 discloses a method for forming a composite optical element in which a first optical element and a second optical element material are disposed between an upper die and a lower die, and the second optical element material is pressed by the dies and the first optical element while being heated at a temperature capable of deforming the second optical element material and incapable of deforming the first element to form a second optical element, thereby integrating the first and second optical elements with each other.

In order to prevent a crack caused due to a shortened cooling period from being formed, Patent Document 2 proposes a method of forming a glass lens by directly bonding glasses to each other between which the difference in linear expansion coefficient is in a range between $3 \times 10^{-7}$ and $8 \times 10^{-7}$.

Patent Document 1: Japanese Unexamined Patent Application Publication 60-67118

Patent Document 2: Japanese Patent No. 3763552

SUMMARY OF THE INVENTION

Problems that the Invention is to Solve

In forming a bonded optical element, an increase in bonding strength is an essential demand. The bonding strength depends on the materials, the forming conditions, the shapes, and the like of optical elements.

The present inventors tried to bond glasses by the methods proposed in Patent Documents 1 and 2 to reach a conclusion that though the glass materials disclosed in the Patent Documents could be bonded to each other, bonding of other glass materials to each other not disclosed therein resulted in insufficient bonding strength in some cases and in no attainment of bonding of glass materials to each other in other cases. This means that the bonding strength is ignored in Patent Documents 1 and 2.

The present invention has been made in view of the foregoing and has its object of maintaining the bonding strength at a high level.

Means for Solving the Problems

A bonded optical element in accordance with the present invention includes a first optical element and a second optical element bonded to each other by forming the second optical element by heating and pressing against the first optical element a second optical element material, wherein the second optical element includes an element body part and a contact part extending from the element body part to be in contact with an outer peripheral face of the first optical element.

EFFECTS OF THE INVENTION

According to the present invention, the bonding strength can be maintained at a high level.

BRIEF DESCRIPTION OF THE DRAWINGS

FIG. 2 presents schematic sectional views showing a bonded optical element manufacturing method, wherein FIG. 2(a) shows a state in which formation of a second optical element is prepared and FIG. 2(b) shows a state in which formation of the second optical element is completed.

BEST MODE FOR CARRYING OUT THE INVENTION

An embodiment of the present invention will be described below with reference to the accompanying drawings.

Figure 1:
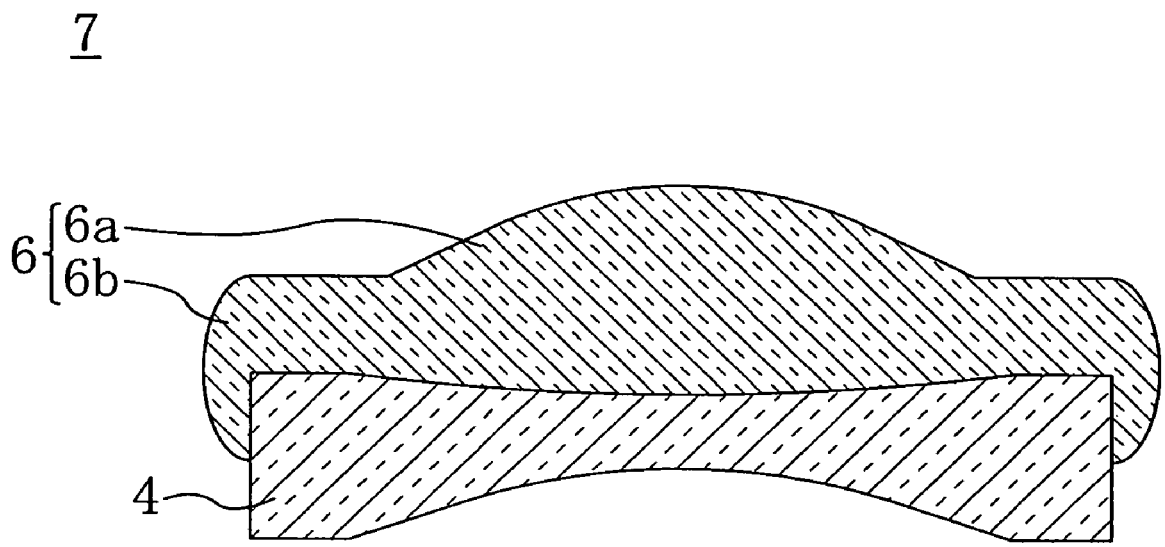
FIG. 1 is a sectional view of a bonded optical element in accordance with an embodiment of the present invention.

FIG. 1 is a sectional view of a bonded optical element 7 in accordance with the present embodiment. As shown in FIG. 1, the bonded optical element 7 includes first and second optical elements 4, 6. The first optical element 4 is a spherical biconcave lens having an outer diameter of 10 mm, a center thickness of 2 mm, and an edge thickness of 4 mm. The first optical element 4 is made of a material, VC79 (a product by Sumida Optical Glass Inc.) having a refractive index nd of 1.60970, an Abbe number vd of 57.8, a glass transition temperature (transition temperature) Tg of 561° C., a glass softening temperature (a flexure temperature) At of 553° C., and a coefficient α of thermal expansion of $93 \times 10^{-6}$. The first optical element 4 is formed by polishing.

The second optical element 6 is bonded directly to the upper face of the first optical element 4 to be integrated therewith. The second optical element 6 is a spherical biconvex lens having an outer diameter of 14 mm, a center thickness of 4 mm, and an edge thickness of 2 mm. Namely, the outer diameter of the second optical element 6 is larger than that of the first optical element 4. The second optical element 6 includes an element body part 6a arranged on the upper face of the first optical element 4 and a contact part 6b extending downward from the outer edge (the outer periphery) of the element body part 6a so as to be in contact with the outer peripheral face of the first optical element 4. Specifically, the contact part 6b is formed so as to extend up to the substantial center in the thickness direction of the edge portion of the first optical element 4 around the entire periphery of the outer edge of the element body part 6a and is in contact with the entire periphery of the upper part of the outer peripheral face of the first optical element 4. With this arrangement, the contact part 6a calks the first optical element 4.

The second optical element 6 is made of a material, CD45 (a product by Sumida Optical Glass Inc.) having a refractive index nd of 1.69320, an Abbe number vd of 33.7, a glass transition temperature Tg of 470° C., a glass softening temperature At of 507° C., and a coefficient α of thermal expansion of $110 \times 10^{-6}$. Namely, the glass softening temperature At of the second optical element 6 is lower than the glass transition temperature Tg and the glass softening temperature At of the first optical element 4, and the coefficient α of thermal expansion of the second optical element 6 is larger than that of the first optical element 4.

Figure 2:
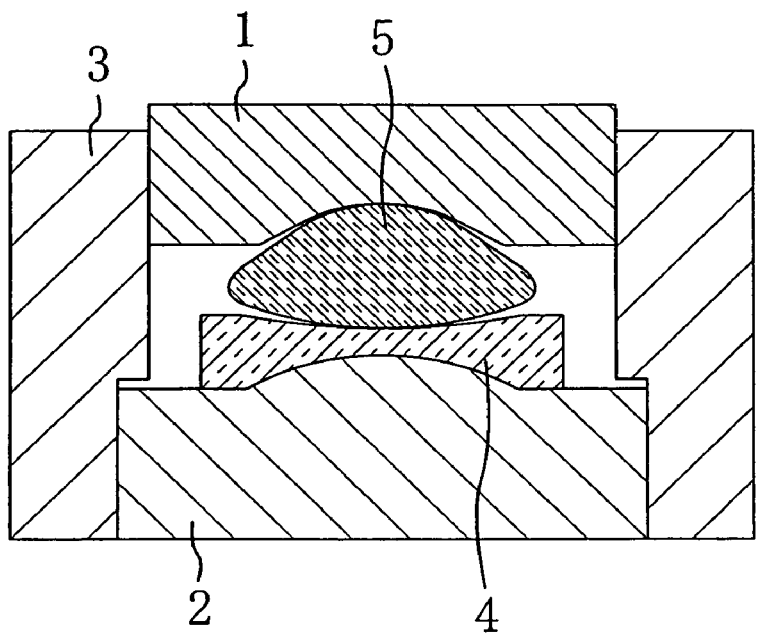
Figure 2:
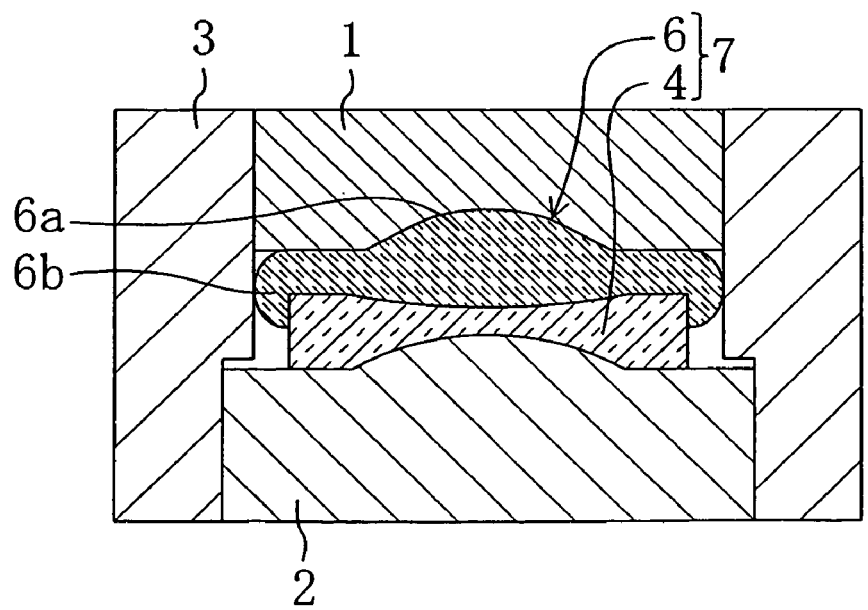

A method for manufacturing the bonded optical element 7 will be described below with reference to FIG. 2. FIG. 2 presents schematic sectional views showing the method for manufacturing the bonded optical element 7, wherein FIG. 2(a) shows a state in which formation of the second optical element is prepared and FIG. 2(b) shows a state in which formation of the second optical element is completed.

First, the first optical element 4 and a second optical element material 5 are prepared. The outer diameter of the first optical element material 5 is smaller than the inner diameter of a sleeve die 3, as shown in FIG. 2. Accordingly, a space is formed between the outer peripheral face of the first optical element 4 and the inner peripheral face of the sleeve die 3. The outer diameter of the second optical element material 5 is smaller than that of the first optical element 4.

Next, a lower die 2 is inserted into the sleeve die 3, and the first optical element 4 is put on the lower die 2. Subsequently, the second optical element material 5 is put on the first optical element 4, and then, an upper die 1 is inserted into the sleeve die 3 so as to be placed on the second optical element material 5. When the upper die 1 and the lower die 2 are inserted into the sleeve die 3, the centers of the upper die 1 and the lower die 2 are aligned with each other.

With the use of the upper die 1, the lower die 2, and the sleeve die 3, the second optical element material 5 is pressed against the first optical element 4 while being heated at a temperature incapable of deforming the first optical element 4 and capable of deforming the second optical element material 5 so that the outer diameter of the second optical element 6 becomes larger than that of the first optical element 4. In the present embodiment, the heating temperature is 525° C., the applied pressure is 200 kgf/cm², and the pressing period of time is 60 seconds. Thus, the second optical element 6 is formed, as shown in FIG. 2(b).

Since the space is formed between the outer peripheral face of the first optical element 4 and the inner peripheral face of the sleeve die 3, as described above, the second optical element material 5 gets into the space to form the contact part 6b, as shown in FIG. 2(b).

Thus, the bonded optical element 7 is formed in which the second optical element 6 is bonded to and integrated with the upper face of the first optical element 4. The thus obtained bonded optical element 7, of which second optical element 6 is in contact with the outer peripheral face of the first optical element 4, has sufficient bonding strength and is excellent in quality with no breakage, no crack, and no opacity.

As described above, in the present embodiment, the second optical element 6 includes the element body part 6a and the contact part 6b extending from the element body part 6a so as to be in contact with the outer peripheral face of the first optical element 4, thereby maintaining the bonding strength at a high level.

Further, with the second optical element 6 having a coefficient of thermal expansion larger than that of the first optical element 4, compression stress at the contact part 6b of the second optical element 6 works on the outer peripheral face of the first optical element 4 in cooling after application of heat and pressure to the second optical element material 5, thereby increasing the bonding strength further. Although it is effective for allowing the compression stress to work thereon to set the coefficient of thermal expansion of the second optical element 6 larger than that of the first optical element 4 in this way, the compression stress can be obtained by setting the temperature of the second optical element material 5 higher than that of the first optical element 4 in application of heat and pressure to the second optical element material 5.

In contrast, when a bonded optical element was formed so that the second optical element 6 is out of contact with the outer peripheral face of the first optical element 4, the bonded strength was too low to form the bonded optical element 7. Accordingly, it can be said that the contact of the second optical element 6 to the outer peripheral face of the first optical element 4 enables formation of the bonded optical element 7.

Other Embodiments

The outer diameter and the thickness of each of the first and second optical elements 4, 6 may be arbitrary values different from the values in the above embodiment. As well, the hating temperature, the applied pressure, the pressing period of time may be arbitrary values different from the values in the above embodiment.

The contact part 6b is formed around the entire periphery of the outer edge of the element body part 6a in the above embodiment, but the range where the contact part 6b is formed may be any range as long as it is formed at at least a part of the outer edge of the element body part 6a. Wherein, the contact part 6b is preferably formed around the entire periphery of the outer edge of the element body part 6a.

Further, the contact part 6b is in contact with the upper part of the outer peripheral face of the first optical element 4 in the above embodiment, but its contact range may be any range as long as it is in contact with at least a part in the thickness direction of the outer peripheral face of the first optical element 4.

Figure 3:
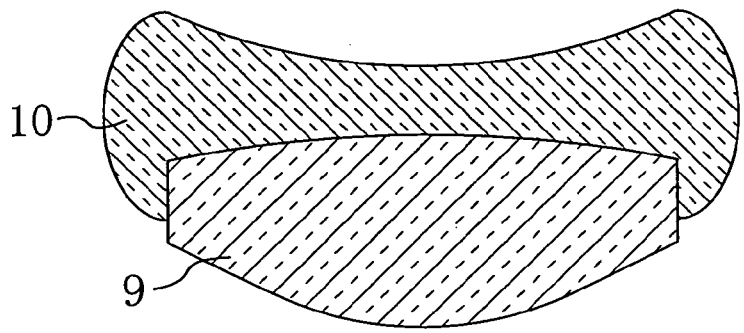
FIG. 3 is a sectional view of a bonded optical element in which a first optical element and a second optical element are a spherical biconvex lens and a spherical biconcave lens, respectively.

In addition, the first optical element 4 and the second optical element 6 are a spherical biconcave lens and a spherical biconvex lens, respectively, in the above invention, but the present invention is not limited thereto. For example, a first optical element 10 and a second optical element 11 may a spherical biconvex lens and a spherical biconcave lens, respectively, as shown in FIG. 3. Further, one or both of the faces opposite to the bonded faces of the first and second optical elements may be aspheric.

The first optical element 4 is formed by polishing in the above embodiment, but the present invention is not limited thereto and the first optical element may be formed by press forming, for example.

Figure 4:
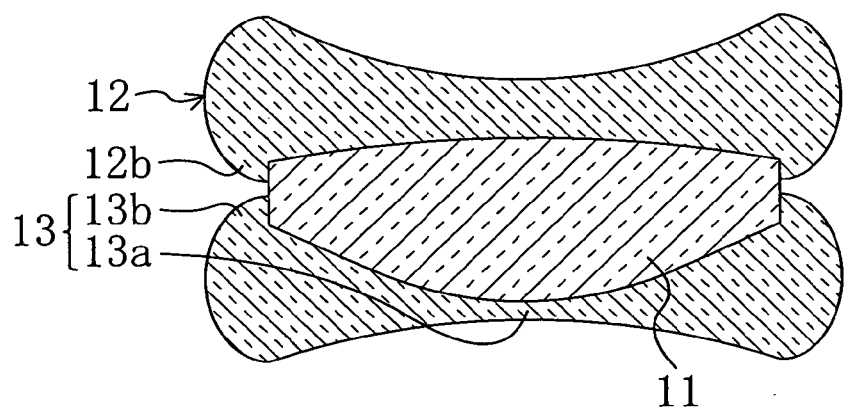
FIG. 4 is a sectional view of a bonded optical element in which a second optical element and a third optical element are bonded to and integrated with the upper face and the lower face of a first optical element, respectively.

In the above embodiment, a third optical element may be further provided which is bonded to and integrated with the first or second optical element. For example, as shown in FIG. 4, a second optical element 12 and a third optical element 13 may be directly bonded to and integrated with the upper face (one of the faces) and the lower face (the other face) of a first optical element 11, respectively, by the same manner as in the above embodiment. The third optical element 13 has almost the same structure as the second optical element 6. Namely, the third optical element 13 includes an element body part 13a arranged on the lower face of the first optical element 11 and a contact part 13b extending upward from the outer edge of the element main body 13a so as to be in contact with the outer peripheral face of the first optical element 11. The contact parts 12b, 13b of the second and third optical elements 12, 13 are out of contact with each other. In this case, the second and third optical elements 12, 13 may be formed simultaneously or separately.

Figure 5:
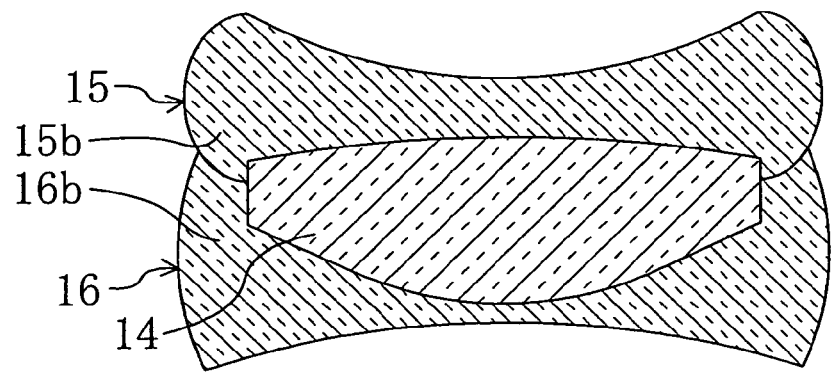
FIG. 5 is a sectional view of a bonded optical element in which a second optical element and a third optical element are bonded to and integrated with the upper face and the lower face of a first optical element, respectively.

Alternatively, as shown in FIG. 5, a second optical element 15 and a third optical element 16 made of a material different from that of the second optical element 15 may be directly bonded to and integrated with the upper face and the lower face of a first optical element 14, respectively, by the same manner as in the above embodiment so that the contact parts 15b, 16b of the second and third optical elements 15, 16 are in contact with each other. In other words, the first optical element 14 may be enclosed by the second and third optical elements 15, 16. In this case, the second and third optical elements 15, 16 may be formed simultaneously or separately.

Figure 6:
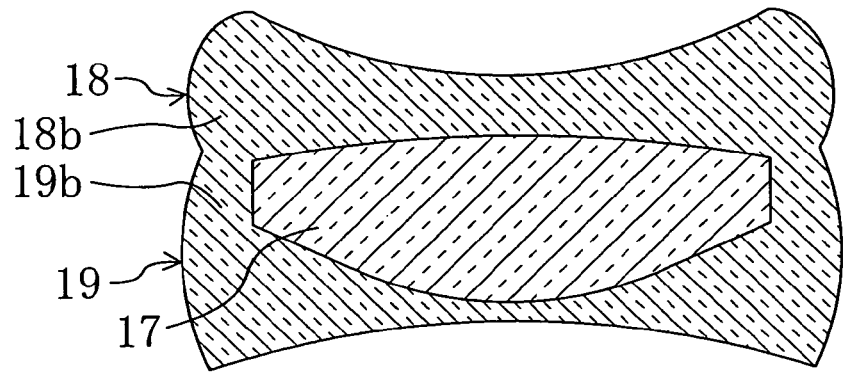
FIG. 6 is a sectional view of a bonded optical element in which a second optical element and a third optical element are bonded to and integrated with the upper face and the lower face of a first optical element, respectively.
Figure 7:
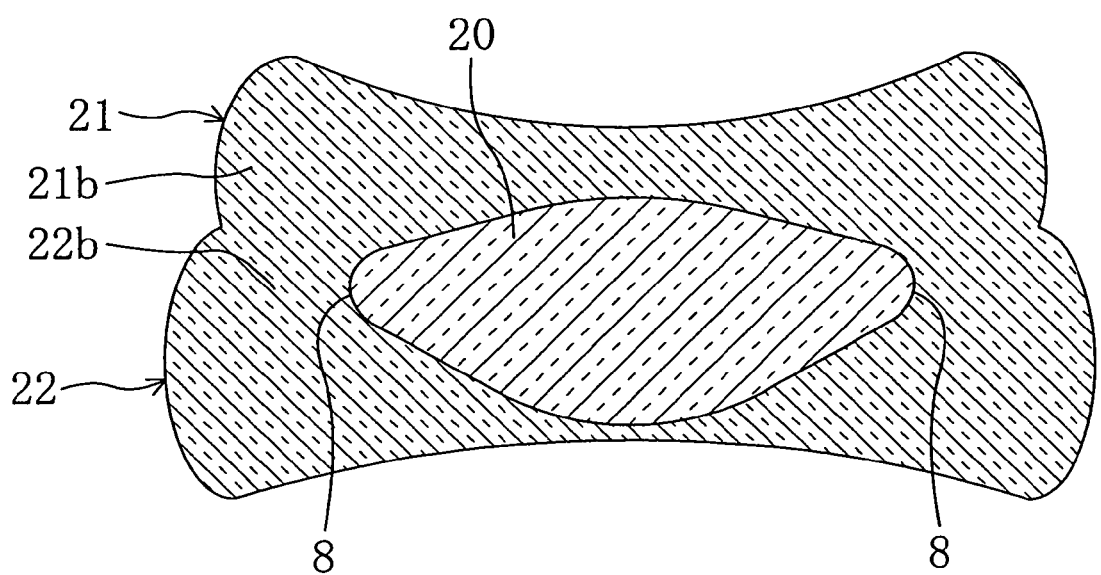
FIG. 7 is a sectional view of a bonded optical element in which a second optical element and a third optical element are bonded to and integrated with the upper face and the lower face of a first optical element, respectively.

Alternatively, as shown in FIG. 6, a second optical element 18 and a third optical element 19 made of the same material as that of the second optical element 18 may be directly bonded to and integrated with the upper face and the lower face of a first optical element 17, respectively, by the same manner as in the above embodiment so that the contact parts 18b, 19b of the second and third optical elements 18, 19 are bonded to and integrated with each other. Namely, the first optical element 17 may be enclosed by the second and third optical elements 18, 19. To do so, the second and third optical elements 18, 19 are formed simultaneously.

In addition, a second optical element 21 and a third optical element 22 made of the same material as that of the second optical element 21 may be directly and respectively bonded to and integrated with the upper face and the lower face of a first optical element 20, which is a spherical biconvex lens having a curved outer peripheral face 8 substantially in an R shape in section protruding radially outward, by the same manner as in the above embodiment so that the contact parts 21b, 22b of the second and third optical elements 21, 22 are bonded to and integrated with each other. Namely, the first optical element 20 may be enclosed by the second and third optical elements 21, 22. To do so, the second and third optical elements 21, 22 are formed simultaneously. With the curved outer peripheral face 8 of the first optical element 20 substantially in an R shape in section, occurrence of breakage and cracks caused due to bonding of the first to third optical elements 20 to 22 can be suppressed.

The first and second optical elements 4, 6 are made of the aforementioned glass materials in the above embodiment, but the present invention is not limited thereto and they may be made of glass materials different from the glass materials in the above embodiment or may be made of plastic. Wherein, the first and second optical elements 4, 6 are preferably made of glass materials. The glass-made first and second optical elements 4, 6 bring the bonded optical element 7 to have a highly accurate form, high heat resistance, high mechanical durability, and high homogeneity. The same is applicable to the aforementioned bonded optical element 7 including the third optical element.

Figure 8:
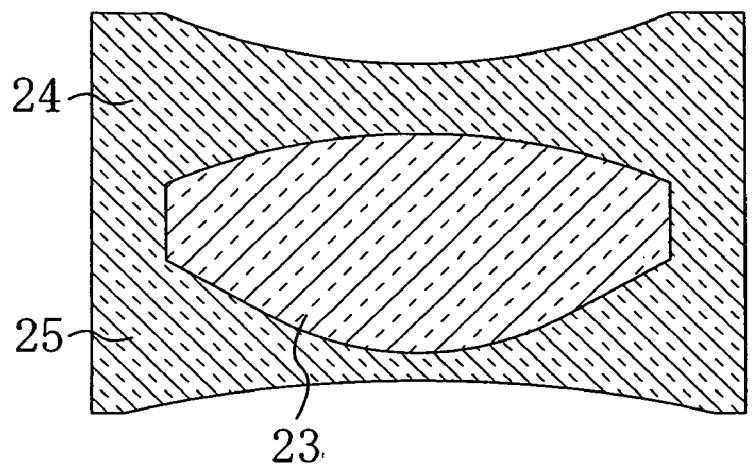
FIG. 8 is a sectional view of a bonded optical element in which only second and third optical elements are subjected to centering.

In the above embodiment, at least one of the optical elements may be centered after bonding and integrating the optical elements. For example, as shown in FIG. 8, after first to third optical elements 23 to 25 are bonded to and integrated with one another, only the second and third optical elements 24, 25 may be centered. Alternatively, only one of the second and third optical elements 24, 25 may be centered, or all of the first to third optical elements 23 to 25 may be centered. Centering in this way improves the eccentricity accuracy of the bonded optical element 7.

Figure 9:
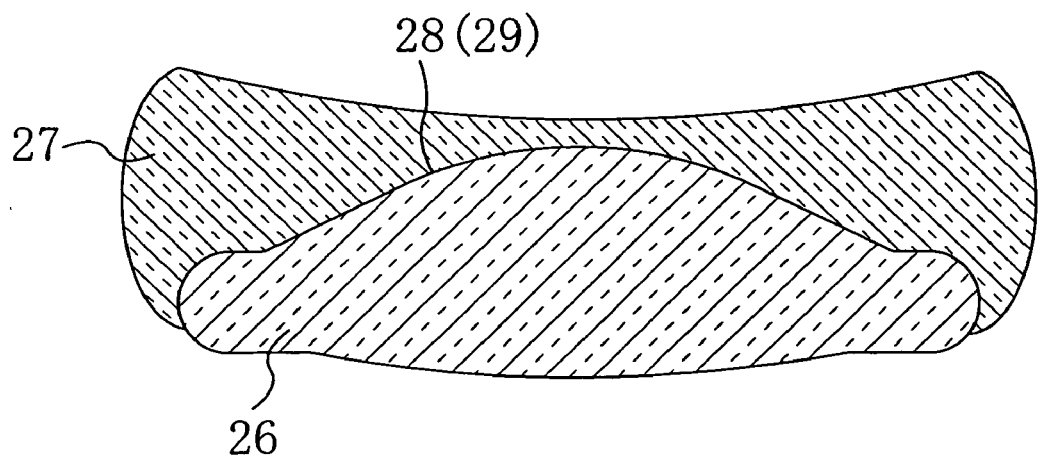
FIG. 9 is a sectional view of a bonded optical element of which lens face parts of the bonded faces are aspheric.

The first optical element 4 is a spherical lens in the above embodiment, but a lens face part (an optically functioning face part) 28 of the bonded face of a first optical element 26 to a second optical element 27 may be aspheric, as shown in FIG. 9. In this case, a lens face part 29 of the bonded face of the second optical element 27 to the first optical element 26 is aspheric also. Each of the lens face parts 28, 29, which include the optically effective face, is a curved face ranging up to the upper face (the edge face) of the edge portion. The aspheric lens face parts 28, 29 of the bonded faces of the bonded optical element 7 lead to an improvement on the degree of freedom in designing an optical system, thereby leading to multifunction and compaction of an optical system. In the case where the first optical element 26 is formed by press forming herein, the lens face part 28 thereof can be easily formed so as to be aspheric. The same is applicable to the aforementioned bonded optical element 7 including the third optical element.

The present invention is not limited to the above embodiments and can be reduced in practice in various ways without deviating from the sprit and the main subject matter of the present invention.

As described above, the above embodiments are mere examples in every aspect and must not be construed limitedly. The scope of the present invention is indicated by the attached claims and is not limited to the specification. Further, any of variations and modifications belonging to the equivalent scope of the claims fall in the scope of the present invention.

INDUSTRIAL APPLICABILITY

As described above, the present invention is applicable for the purpose of maintaining the bonding strength at a high level and the like.

What is claimed is:

1. A bonded optical element comprising a first optical element and a second optical element bonded to each other by forming the second optical element by heating and pressing against the first optical element a second optical element material, wherein:

the second optical element includes an element body part and a contact part extending from the element body part to be in contact with an outer peripheral face of the first optical element, and the optical elements are made of glass materials.

2. The bonded optical element of claim 1, further comprising:

a third optical element bonded to the first or second optical element.

3. The bonded optical element of claim 2, wherein the second optical element is bonded to one of faces of the first optical element, and the third optical element is bonded to the other face of the first optical element and includes an element body part and a contact part extending from the element body part thereof to be in contact with the outer peripheral face of the first optical element.

4. The bonded optical element of claim 3, wherein the contact parts of the second and third optical elements are in contact with or bonded to each other.

5. The bonded optical element of claim 1, wherein the second optical element has a coefficient of thermal expansion larger than the first optical element.

6. The bonded optical element of claim 1, wherein at least one of the optical elements is centered after the optical elements are bonded to each other.

7. The bonded optical element of claim 1, wherein lens face parts of bonded faces of the optical elements are aspheric.

8. A bonded optical element comprising a first optical element and a second optical element bonded to each other by forming the second optical element by heating and pressing against the first optical element a second optical element material, wherein:

the second optical element includes an element body part and a contact part extending from the element body part to be in contact with an outer peripheral face of the first optical element, and lens face parts of bonded faces of the optical elements are aspheric.

* * * * *